United States Patent [19]

Drury

[11] Patent Number: 4,469,360
[45] Date of Patent: Sep. 4, 1984

[54] VEHICLE BULL-BAR

[75] Inventor: Norman K. Drury, Bankstown, Australia

[73] Assignee: Drumac Holding Pty. Limited, New South Wales, Australia

[21] Appl. No.: 457,210

[22] Filed: Jan. 11, 1983

[30] Foreign Application Priority Data

Jan. 21, 1982 [AU] Australia ............................. PF2379

[51] Int. Cl.³ ............................................. B60R 19/02
[52] U.S. Cl. .................................... 293/102; 293/144; 293/155
[58] Field of Search ................. 293/38, 144, 143, 142, 293/155, DIG. 1, 102

[56] References Cited

U.S. PATENT DOCUMENTS

| 2,214,514 | 9/1940 | Walklet | 293/144 |
| 2,215,001 | 9/1940 | Jandus  | 293/144 |
| 2,250,565 | 7/1941 | Bahr    | 293/144 |
| 2,580,775 | 1/1952 | Helms   | 293/144 |

Primary Examiner—Robert R. Song
Attorney, Agent, or Firm—Fraser, Barker, Purdue & Clemens

[57] ABSTRACT

A vehicle bull-bar or fender of the kind comprising an array of fender bars mounted on a pair of upright stanchions fixed by their lower-ends to the front of the vehicle, has a C-shaped fender bar freely insertable and through holes in the tops of the stanchions and has its ends removably secured to the stanchions intermedially of their ends. One or more other fender bars extend between the stanchions parallel to and out of axial alignment with any part of said C-shaped fender bar. The ends of the other fender bar (or bars) are removably secured to the stanchions. The invention also comprises a method of assembling the parts of the bull-bar as aforesaid.

3 Claims, 5 Drawing Figures

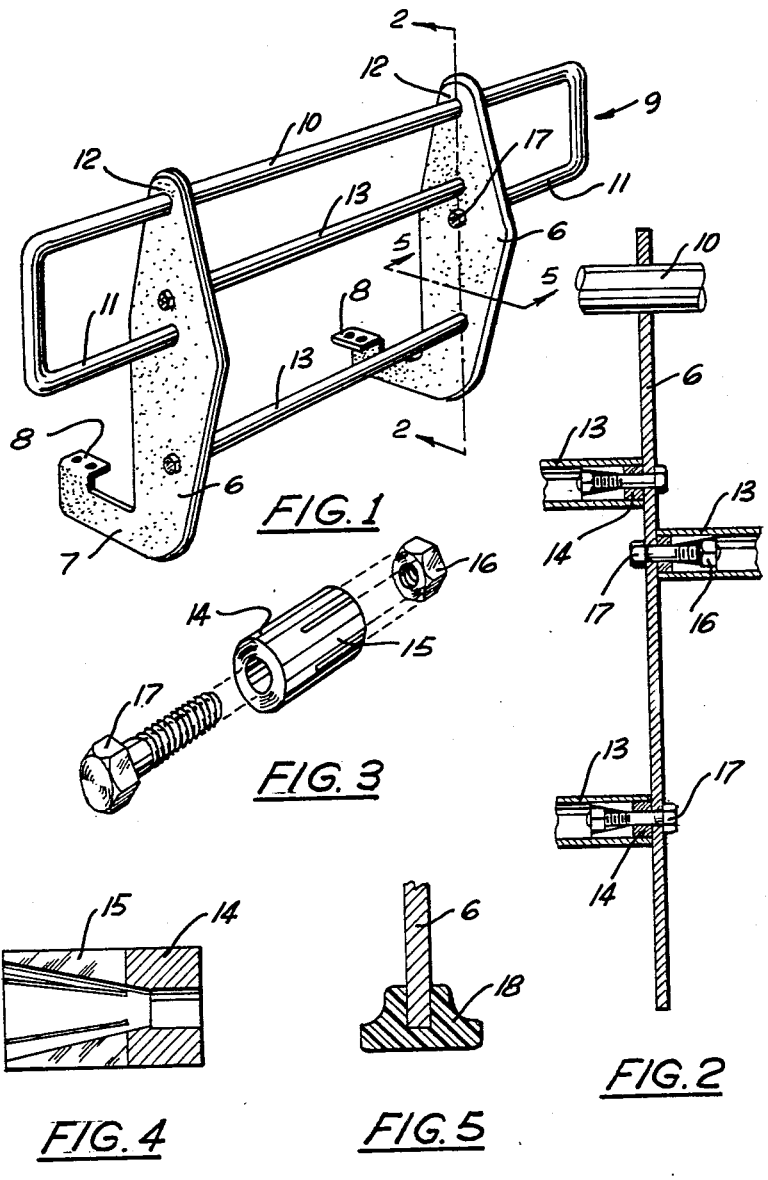

VEHICLE BULL-BAR

This invention relates to bull-bars; that is, those guards or shielding means erected on, and in front of, a vehicle to protect it in the event of head-on collision with an animal or other obstruction.

Bull-bars of the kind in question usually comprise a pair of laterally spaced stanchions having lower ends adapted to be secured by bolting to the leading ends of the vehicle chassis members, and having upper end portions spaced from and upstanding in front of the vehicle structure. The stanchions carry an array of fender bars (usually tubular) whereof the lateral span is substantially equal to the width of the vehicle.

The existing bull-bars are largely satisfactory in use. Even so, they are open to objection in some respects. For example, the conventional bull-bars are made up by welding the parts together. This means that they are not easily transported by reason of their awkward shape and expanse. The bull-bar parts could, of course, be assembled at the site of installation, but that would involve having welding equipment on the site, and such equipment or persons able to use it, are not always readily available at such sites. Another disability of the conventional bull-bar is that if a part of it is damaged it is not readily replaceable by an undamaged part.

The object of this invention is to overcome the stated disabilities in a simple way by the provision of a bull-bar construction, and a method of making it, whereby all of its parts may be separate and flatly packed into relatively small compass, and subsequently assembled together and installed without need for skill or any equipment other than a simple tool such as a spanner.

The invention provides a method of assembling a vehicle bull-bar of the kind comprising a pair of laterally spaced stanchions having lower ends adpated for affixture to the vehicle structure, and upper end portions which, in use, are spaced from and upstanding in front of that structure; and, an array of tubular fender bars mounted on said stanchions, said method comprising:

(a) providing a pair of stanchions as aforesaid, (b) applying to said stanchions a C-shaped fender bar whereof the spine extends freely through holes in said stanchions, (c) removably and respectively securing the ends of said C-shaped fender bar to said stanchions, and (d) removably securing at least one further fender bar by its ends to and between said stanchions, parallel to but out of axial alignment with any portion of said C-shaped fender bar.

The invention also provides a bull-bar when made by a method according to the preceding paragraph.

A bull-bar according hereto is illustrated, by way of example, in the drawings herewith.

In the drawings:

FIG. 1 is a perspective view of an assembled bull-bar,

FIG. 2 is a sectional detail, on an enlarged scale, along line 2—2 in FIG. 1.

FIG. 3 is a perspective detail of preferred fastening means.

FIG. 4 is a section of a circular wedge member forming part of said fastening means, and FIG. 5 is a fragmentary section taken on line 5—5 in FIG. 1.

Referring to the drawings, a pair of plate-like stanchions 6 have their lower ends 7 adapted for affixture to the vehicle structure, for example, by way of bolting lugs 8. A tubular C-shaped fender bar 9 has a spine 10 and ends 11. Spine 10 is able to extend freely through holes 12 in stanchions 6. Two further tubular fender bars 13 are provided. One of these may be omitted, more than two may be provided.

The ends 11 and the ends of the bars 13 are furnished with means for removably affixing them to the stanchions. These means preferably consist (in respect of each bar concerned) of an expansible wedge sleeve 14 having a slitted end portion 15, a nut 16 freely able to enter slitted end portion 15, and a screw 17.

The leading upright edges of the stanchions, or parts of those edges, may be cushioned by application thereto of buffer strip material made of rubber, plastics or the like as well understood and as indicated at 18 (FIG. 5).

Prior to, or during, assembly of the bull-bar, each of the sleeves 14 has its nut 16 inserted, and lightly frictionally retained, in its split end portion 15. The sleeves are then inserted in the several ends concerned, with the nut-loaded split ends innermost of the fender bar concerned.

The fender bar 9 is then threaded (freely) through the two stanchion holes 12 and the ends 11 butted against the stanchions 6. Screws 17 are then passed through holes in the stanchions, through the sleeves 14 inserted in ends 11, and tightened in the nuts 16. The bars 13 are removably secured to the stanchions in the same way.

I claim:

1. A vehicle bull-bar comprising:
   (a) a pair of upright stanchions adapted to be secured by their lower ends to the vehicle structure and having holes formed in their upper ends,
   (b) a C-shaped fender bar which extends freely through said holes,
   (c) means for removably securing the ends of said C-shaped fender bar to said stanchions intermediately of the ends thereof, and
   (d) at least one further fender bar which extends between said stanchions and has its ends removably secured thereto.

2. A bull-bar according to claim 1 wherein said fender bars are tubular and have their ends secured to said stanchions by way of expansible wedge sleeves inserted in said ends, nuts fitting within said wedge sleeves, and headed screws which extend through said stanchions, into said nuts.

3. A method of assembling a vehicle bull-bar of the kind comprising a pair of laterally spaced stanchions having lower ends adapted for affixture to the vehicle structure, and upper end portions which, in use, are spaced from and upstanding in front of that structure; and, an array of tubular fender bars mounted on said stanchions, said method comprising:
   (a) providing a pair of stanchions as aforesaid,
   (b) applying to said stanchions a C-shaped fender bar having a spine whereof the spine extends freely through holes in said stanchions,
   (c) each end of said C-shaped fender bar removably secured to a respective one of said stanchions, and
   (d) removably securing at least one further fender bar by its ends to and between said stanchions, parallel to but out of axial alignment with any portion of said C-shaped fender bar.

* * * * *